United States Patent [19]
Bixby

[11] 3,863,570
[45] Feb. 4, 1975

[54] HYDRAULIC PRESSURE ACTUATED MISSILE STAGE SEPARATION

[75] Inventor: Harold W. Bixby, Encino, Calif.

[73] Assignee: the United States of America, as represented by the Secretary of the Navy, Washington, D.C.

[22] Filed: Feb. 15, 1974

[21] Appl. No.: 442,993

[52] U.S. Cl. .............................................. 102/49.4
[51] Int. Cl. ............................................ F42b 15/10
[58] Field of Search ............. 102/49.4, 49.5; 89/1 B; 85/33

[56] References Cited
UNITED STATES PATENTS 3,262,351  7/1966  Webb .................................. 89/1 B
3,405,593  10/1968  Kriesel ................................. 89/1 B
3,597,919  8/1971  Lilly .................................. 102/27 R

*Primary Examiner*—Verlin R. Pendegrass
*Attorney, Agent, or Firm*—Lawrence A. Neureither; Jack W. Voigt; Charles R. Carter

[57] ABSTRACT

A device for use in separating stages of a missile during missile flight wherein hydraulic pressure initiates operation of the device. This hydraulic pressure provides low resultant power at the break joint to cause expansion of a segmented nut. Expansion of the segmented nut releases a stage connecting bolt and the power further exerts a force on the bolt to assist in forcing the missile stages apart.

3 Claims, 3 Drawing Figures

HYDRAULIC PRESSURE ACTUATED MISSILE STAGE SEPARATION

BACKGROUND OF THE INVENTION

This invention relates to the field of missile stage separation devices. Reliable and efficient missile staging is difficult to achieve without transmitting a high resultant shock to the missile structure. Previous separation devices have required power from an explosive source to produce the necessary high resultant shock. This explosive force in turn created a hazard for the shock sensitive equipment carried by the missile.

SUMMARY OF THE INVENTION

The present invention has overcome the problem of shock hazards by utilizing hydraulic pressure to supply low resultant power at the break joint of missile stage separation. Low power is introduced into the break joint to cause expansion of a segmented nut and release the bolt. The power is then exerted on the released bolt to force the missile stages apart with no shock to sensitive equipment carried by the missile.

This invention may be better understood from the following detailed description taken in conjunction with the accompanying drawing.

DESCRIPTION OF THE PREFERRED EMBODIMENT

Figure 1:
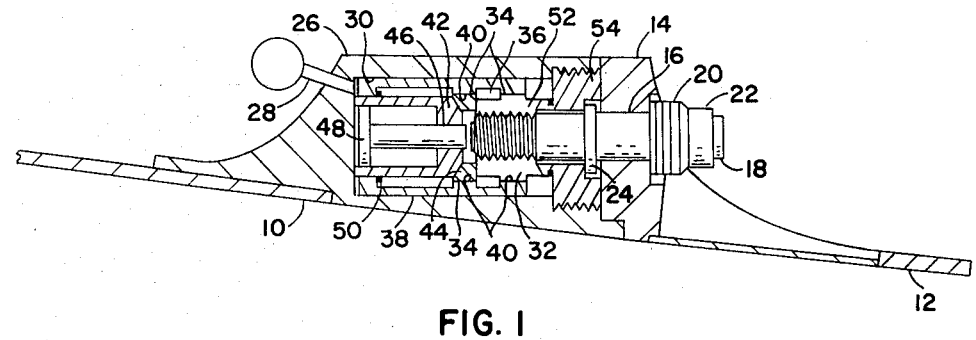
FIG. 1 is a side view of the device before missile stage operation.
Figure 2:
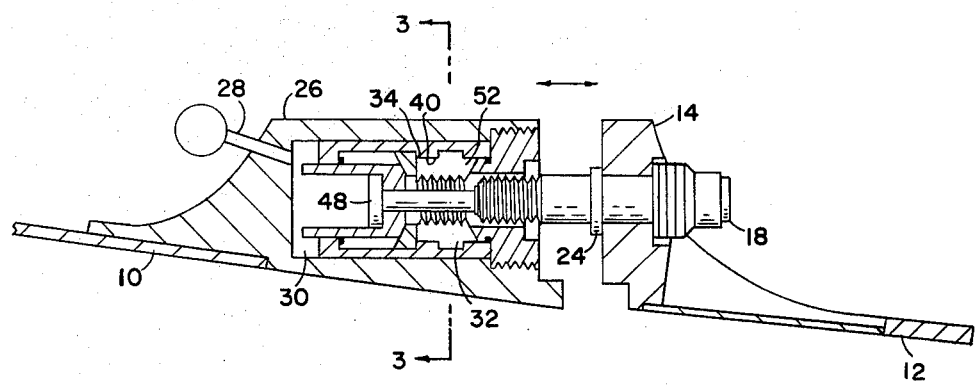
FIG. 2 is a side view of the device just after missile stage separation.
Figure 3:
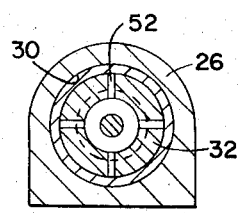
FIG. 3 is a view along line 3—3 of FIG. 2 showing the segmented nut.

Reference numerals 10 and 12 respectively identify forward and aft missile stages that are to be separated at a predetermined time during missile flight. A forward frame 26 includes a hydraulic pressure inlet 28 which provides passage to a chamber 30 for housing the operating elements of the device. One end of a bolt 18 has threads that connect to a segmented nut 32 for attaching the forward and aft stages together. The periphery of nut 32 is provided with projections 34 and recesses 36. A locking cylinder 38 is located in chamber 30 for slidable movement therein and surrounds nut 32. The inner surface of one end of cylinder 38 is provided with projections 40 for producing a locking force on nut projections 34. A separator piston 42 is fitted in the other end of cylinder 38 and abuts the tapered end 44 of nut 32. Piston 42 has a central opening 46 to allow movement of a thruster piston 48 which is positioned closely adjacent the threaded end of bolt 38, shown in FIG. 1. A lockring 50 engages a shallow groove on the outer surface of piston 42 and restricts movement of the locking cylinder 38 until sufficient pressure is built up to cause movement thereof. A flat spacer 52 is held in bolt engagement position, bearing radially against projections of the locking cylinder 38 and bearing longitudinally between the threaded segments 32 adjacent to the sloped surfaces of the separator piston 42 and a retainer base 54. The spacer is keyed to the retainer base to resist turning the threaded segments as the bolt 18 is assembled with a torque until collar 24, made integral with the bolt, abuts the inside of retainer face 54. Attached to the aft stage 12 is an aft frame 14 having an aperture 16 extending therethrough. As the missile stages are brought together, the exposed threaded end of bolt 18 extends through the aperture and is engaged by washers 20 and a nut 22. While only one device has been shown, several are used to attach missile stages together and are operated simultaneously for stage separation.

In operation hydraulic pressure is introduced to inlet 28 to supply low resultant power for operation of the devices. When the restricting force of locking 50 has been overcome the locking cylinder 38 slides projections 40 longitudinally from their abutting position with projections 34 as shown in FIG. 1 and to position the projections 40 directly about nut recesses 36. The hydraulic pressure also causes separator piston 42 to move the segments of nut 32 radially outward until nut recess 36 engages cylinder projection 40 and frees bolt 18. These segments are locked in the open position by the force of the separator piston and thrustor piston 48, which is actuated by the force of the hydraulic pressure, pushes against the end of the bolt 18 and collar 24 to force the missile stage apart.

I claim:

1. A hydraulic pressure actuated device for separating stages of a missile during flight comprising: a first frame attached to one of the missile stages; a second frame attached to a second missile stage and provided with a housing chamber therein, an inlet in said second frame providing a pressure passageway to said chamber; a segmented nut in said chamber; a bolt connecting said first frame with said segmented nut, said bolt being provided with a collar for engaging the inner side of said first frame, said first and second frames being attached to each other when said bolt is connected to the segmented nut and said collar being disposed between said frames, and pressure actuated means for radially displacing segments of said nut to release the connection between said bolt and segmented nut and for exerting a thrusting force on said collar to force said stages apart.

2. A device as set forth in claim 1 wherein said pressure actuated means for displacing said segmented nut includes a locking cylinder positioned in said chamber for slidable movement therein and surrounding said segmented nut and a separator piston for radially displacing said nut segments when released by said locking cylinder.

3. A device as set forth in claim 2 wherein said pressure actuated thrusting force comprises a thrustor piston located in said chamber and motivated by the hydraulic pressure to move said bolt and collar to force the stages apart.

* * * * *

UNITED STATES PATENT OFFICE
CERTIFICATE OF CORRECTION

PATENT NO. : 3,863,570
DATED : February 4, 1975
INVENTOR(S) : Harold W. Bixby

It is certified that error appears in the above-identified patent and that said Letters Patent are hereby corrected as shown below:

In the heading should read:

[73] Assignee: the United States of America, as represented by the Secretary of the Army, Washington, D. C.

Signed and sealed this 27th day of May 1975.

(SEAL)
Attest:

RUTH C. MASON
Attesting Officer

C. MARSHALL DANN
Commissioner of Patents
and Trademarks